UNITED STATES PATENT OFFICE.

GRANT HAMMOND, OF SAN FRANCISCO, CALIFORNIA, ASSIGNOR OF ONE-HALF TO THOMAS FLINT, JR., OF SAN JUAN, CALIFORNIA.

ALUMINIUM-SOLDER.

SPECIFICATION forming part of Letters Patent No. 598,341, dated February 1, 1898.

Application filed June 18, 1897. Serial No. 641,370. (No specimens.)

*To all whom it may concern:*

Be it known that I, GRANT HAMMOND, a citizen of the United States, residing in the city and county of San Francisco, State of California, have invented an Improvement in Aluminium-Solder; and I hereby declare the following to be a full, clear, and exact description of the same.

My invention relates to a compound which is especially adapted for the soldering or uniting of articles made either wholly of aluminium or partly of aluminium and other metals to which it is desired to solder the aluminium.

It has been found exceedingly difficult to produce a solder which would serve to unite aluminium, because the aluminium is a strongly-electropositive metal, and the use of the common solders produces an electrical action which soon destroys any joint made with them.

In the preparation of my solder I employ various proportions of tin, silver, zinc, and aluminium. I have found that a very good proportion is, by weight, tin, one hundred parts; silver, twenty parts; zinc, ten parts; aluminium, from one to six parts. These materials are melted and intimately mingled, and when a surface is to be soldered therewith it must be first scraped thoroughly clean and bright with some sharp instrument, or the thin oxidation which forms the dullness on the surface must be otherwise removed. The metal having been prepared the parts are first coated with a flux which I employ for the purpose. The solder may then be laid upon the joint or between the lap or joint of the metal, and it may then be heated in a clean flame—such as a flame from a Bunsen burner, gasolene blowpipe, or any flame free from smoke or soot. A copper soldering-bit, which has been filed clean and smooth and then coated with this solder and heated to the proper degree, may be used, but it requires great care, and its use is not advisable when the work can be done with the flame, as previously described.

If sheets are to be soldered together, the heat can be very readily applied by the blowpipe-flame from the under side.

In the employment of this compound I find that the aluminium produces the necessary hardness and toughness of the compound, and it also prevents the tendency to porosity, blow-holes, or brittleness which would otherwise be present in the alloy alone.

Having thus described my invention, what I claim as new, and desire to secure by Letters Patent, is—

1. A solder for aluminium consisting of tin, silver, zinc and aluminium the proportion of tin being in excess of the silver and the proportion of silver being largely in excess of the zinc.

2. A solder for aluminium consisting of tin one hundred parts, silver twenty parts, zinc ten parts and aluminium from one to six parts.

In witness whereof I have hereunto set my hand.

GRANT HAMMOND.

Witnesses:
S. H. NOURSE,
JESSIE C. BRODIE.